United States Patent [19]

Schexnayder et al.

[11] 4,425,758
[45] Jan. 17, 1984

[54] MAINTAINING HYDROSTATIC SYSTEM CONTROL PRESSURE

[75] Inventors: Lawrence F. Schexnayder, Joliet; Jerome A. Thies, Geneseo, both of Ill.

[73] Assignee: Caterpillar Tractor Co., Peoria, Ill.

[21] Appl. No.: 361,306

[22] Filed: Mar. 24, 1982

[51] Int. Cl.[3] .............................................. F16D 39/00
[52] U.S. Cl. ........................................ 60/403; 60/430; 60/444; 60/452; 60/455; 138/114
[58] Field of Search .................. 60/403, 404, 405, 406, 60/443, 444, 455, 657, 430, 452; 138/104, 111, 113, 114; 137/312

[56] References Cited

U.S. PATENT DOCUMENTS

| | | | |
|---|---|---|---|
| 2,838,074 | 6/1958 | Lauck | 138/49 |
| 3,299,417 | 1/1967 | Sibthorpe | 340/242 |
| 3,528,243 | 9/1970 | Cryder et al. | 60/52 |
| 4,149,568 | 4/1979 | Kuntz et al. | 138/114 |
| 4,265,235 | 5/1981 | Fukunaga | 138/114 |

FOREIGN PATENT DOCUMENTS 462273 7/1928 Fed. Rep. of Germany .

Primary Examiner—Robert E. Garrett
Assistant Examiner—Scott Moritz
Attorney, Agent, or Firm—J. W. Burrows

[57] ABSTRACT

A hydrostatic transmission (10) includes a variable displacement pump (12) for driving a fluid motor (14) in first and second directions. First and second high pressure conduits (20,22) connects the pump (12) and motor (14) in a continuous fluid circuit. A control pump (40) supplies make-up fluid to the first and second high pressure conduits (20,22) and simultaneously provides pressurized control fluid to a system control (50) for controlling the operation of the hydrostatic transmission (10). First and second low pressure conduits (24,26) are respectively disposed about the first and second high pressure conduits (20,22) and defines first and second spaces (28,30) therebetween. A pressure control arrangement (32) is connected to the first and second spaces (28,30) to control the maximum pressure level in the spaces (28,30) upon the failure of one of the high pressure conduits (20,22). By controlling the pressure level in the spaces (28,30), pressurized control fluid is maintained for the system control (50).

6 Claims, 1 Drawing Figure

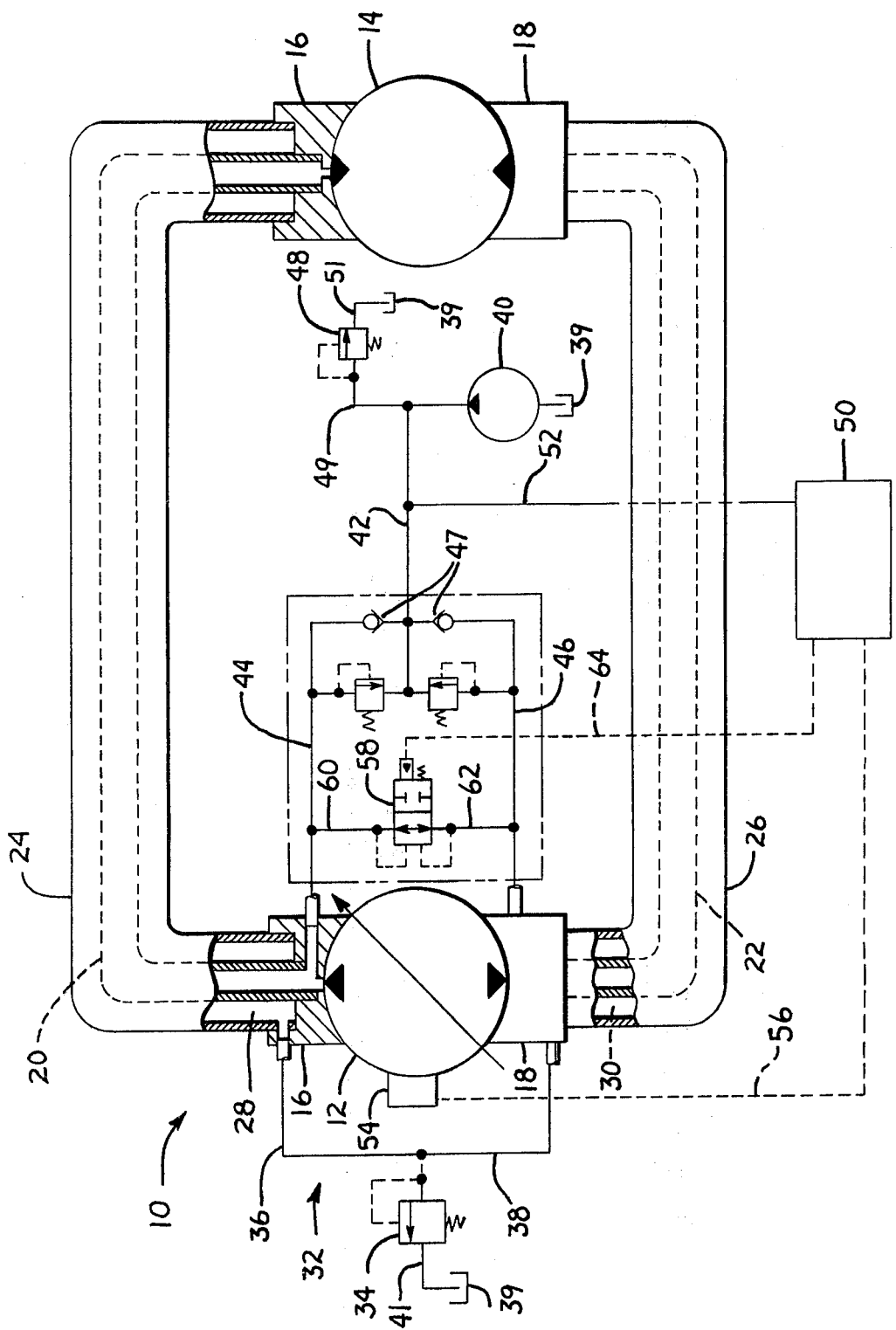

MAINTAINING HYDROSTATIC SYSTEM CONTROL PRESSURE

DESCRIPTION

Technical Field

This invention relates generally to hydrostatic transmission controls for controlling fluid from a pump to a motor in a continuous circuit and more particularly to such a system which prevents the loss of system control and fluid loss upon rupture of one of the pressure conduits connecting the pump and motor.

Background Art

Hydrostatic transmissions for use in a vehicle drive normally have a pump and a motor connected by first and second conduits in a continuous fluid circuit. The pump and/or motor displacement is controlled by a system control that requires a minimum pressure level to operate. These systems have a control pump which supplies fluid to the system control at the minimum pressure level and simultaneously supplies make-up fluid to the first and second conduits at the same minimum pressure level.

One of the problems encountered with such hydrostatic transmissions is that upon the rupture of one of the conduits the transmission is totally inoperative. This happens because the control pump is in fluid communication through the make-up lines with the ruptured line and cannot maintain the minimum pressure level required by the system control. The rupture of the pressure line may happen when the vehicle is in a location that makes servicing the ruptured line impractical. Another problem encountered is the loss of transmission fluid upon the rupture of one of the conduits.

The present invention is directed to overcoming one or more of the problems as set forth above.

Disclosure of the Invention

In one aspect of the present invention a hydrostatic transmission includes a variable displacement pump having a pump control mechanism. A fluid motor is operatively connected to the pump by first and second high pressure conduits in a continuous circuit. The transmission includes a system control for controlling the operation of the hydrostatic transmission. A source of fluid pressure is in fluid communication with the first and second high pressure conduits and the system control to provide make-up fluid to the first and second high pressure conduits and for supplying fluid to the system control at a predetermined pressure level. First and second low pressure conduits are respectively disposed about said first and second high pressure conduits. A first space is defined between an outside diameter of the first high pressure conduit and the inside diameter of the first low pressure conduit while a second space is defined between an outside diameter of the second pressure conduit and an inside diameter of the fourth conduit. A control means establishes a minimum pressure level in the first and second spaces and limits the pressure to a predetermined maximum pressure level upon the rupture of one of the first and second high pressure conduits.

The problem of losing control pressure upon rupture of one of the high pressure conduits connecting the pump and motor is solved by providing a low pressure conduit disposed about the high pressure conduit connecting the pump and the motor and having a space between the high and low pressure conduits communicated to a control mechanism which limits the maximum pressure level in the space and also maintains a minimum control pressure to the system control. Thus, if the high pressure conduit connecting the pump and the motor ruptures, the hydrostatic transmission is still operational in the opposite direction since the control pressure is maintained.

BRIEF DESCRIPTION OF THE DRAWING

The sole FIGURE is a partial schematic and partial diagrammatic representation of an embodiment of the present invention.

Best Mode for Carrying the Invention

Referring now to the drawing, a hydrostatic transmission is generally indicated by reference numeral 10 and includes a variable displacement pump 12 and a fluid motor 14 in continuous fluid communication with the pump 12. The pump 12 and the motor 14 each respectively have first and second conduit mounting brackets 16,18 each being in fluid communication with fluid ports of the respective pump 12 or motor 14. A first high pressure conduit 20 connects one fluid port of the pump 12 to one fluid port of the motor 14 while a second high pressure conduit 22 connects the other fluid port of the pump to the other fluid port of the motor. A first low pressure conduit 24 is disposed about the first high pressure conduit 20 and is connected to the first conduit mounting bracket 16 on the pump 12 and the first conduit mounting bracket 16 on the motor 14. A second low pressure conduit 26 is disposed about the second high pressure conduit 22 and is connected to the second conduit mounting bracket 18 of the pump 12 and the second conduit mounting bracket 18 of the motor 14. Each of the first, second, third and fourth conduits are mounted to the respective mounting brackets 16,18 of the pump 12 and motor 14 by any conventional manner, such as pressing the conduits into the bore of the mounting bracket or bolting the conduits to the mounting brackets.

A first space 28 is defined between the outside diameter of the first high pressure conduit 20 and the inside diameter of the first low pressure conduit 24. A second space 30 is defined between the outside diameter of the second high pressure conduit 22 and the inside diameter of the second low pressure conduit 26.

A means 32 is provided for controlling the pressure level in the first and second spaces 28,30 to a predetermined maximum pressure level upon the rupture or other leakage failure of one of the first and second high pressure conduits 20,22. The controlling means 32 includes a pressure relief valve 34 connected to the first and second spaces 28,30 by conduits 36,38 and to a tank 39 by a conduit 41.

A source of pressurized fluid, such as a control pump 40, receives fluid from a tank 39 and is connected to the first high pressure conduit 20 by conduits 42,44. The control pump 40 is connected to the second high pressure conduit 22 by the conduit 42 and a conduit 46. The conduits 44 and 46 each have a one-way check 47 located in the conduit to conduct fluid flow from the control pump 40 to the respective first and second high pressure conduits 20,22 and to prevent reverse flow through the conduits 44 and 46. A system control relief valve 48 is connected to the conduit 42 by a conduit 49 and to the tank 39 by a conduit 51.

A system control 50 is connected to the control pump 40 by a conduit 52. The variable displacement pump 12 has a pump control mechanism 54 connected to the system control by a signal control line 56.

A reset valve 58 is connected to the conduits 44 and 46 by conduits 60 and 62, respectively. The reset valve 58 is in fluid communication with the system control 50 by a signal conduit 64.

Industrial Applicability

In operation of the hydrostatic transmission 10, the pump 12 supplies pressurized fluid to the motor 14 through the high pressure conduit 20 to drive the motor in one direction. The exhaust flow from the motor 14 is returned to the inlet side of the pump 12 through the high pressure conduit 22. The motor 14 is turned in the opposite direction by reversing the flow from the pump 12 to the motor 14 through the high pressure conduit 22 and the exhaust flow returning from the motor 14 to the inlet of the pump 12 through the high pressure conduit 20. The direction of flow of the output of the pump 12 and the displacement of the pump is controlled by a signal being generated at the system control 50 and delivered to the pump control mechanism 54 by the signal control line 56.

The control pump 40 delivers make-up fluid to the lower pressured one of the high pressure conduits 20,22 at a predetermined minimum pressure level as established by the system control relief valve 48. Consequently, the high pressure conduit that is being utilized as a fluid return to the motor will be maintained at the minimum pressure level. The high pressure in the other high pressure conduit will not affect operation of the control pump 40 because the pressurized flow is blocked at the respective one of the one-way checks 47. The control pump also supplies control fluid to the system control 50 at the same minimum pressure level as established by the system control relief valve 48. The system control 50 requires a predetermined minimum pressure level to provide the necessary control signal to the pump control mechanism 54. Such a system is disclosed in U.S. Pat. No. 3,528,243 to J. R. Cryder et al dated Sept. 15, 1970.

The reset valve 58 is a two-position valve movable between a first position at which the high pressure conduits 20 and 22 are in open fluid communication and a second position at which the fluid communication between the high pressure conduits 20 and 22 is blocked. The two-position valve 58 is movable to the first position in response to pressurized fluid in conduits 60 and 62 with the absence of the control signal from the system control 50. The two-position valve 58 is movable to the second, blocking position in response to a control signal received from the system control 50 acting on a pressure responsive chamber in the end of the two-position valve 58. The control signal from the system control 50 is sufficient to overcome a much higher pressure in either of conduits 60,62 and still maintain the two-position valve 58 in the second blocking position. A two-position valve of this type is shown in the above noted U.S. Pat. No. 3,528,243, FIG. 8 elements 203, 209 and 214.

If, for example, the high pressure conduit 20 is serving as the high pressure conduit and ruptures, the fluid from the high pressure conduit would immediately fill the first and second spaces 28,30 since the pump 12 is supplying the fluid to the ruptured conduit until the pressure level drops below the pressure level being maintained by the control pump. At such time, the fluid from the control pump would continually provide fluid to finish filling the spaces 28,30. Once the spaces 28,30 are filled, the pressure level in the spaces 28,30 would be limited to the maximum pressure level as established by the relief valve 34 which is in fluid communication with the spaces 28,30. All fluid passed across the relief valve 34 is directed to the tank 39. Tank 39 also serves as the supply tank for the control pump 40. Consequently, no fluid is lost from the system due to leakage or rupture in the high pressure conduits 20,22. The control pump 40 would continue to provide fluid to the first or second high pressure conduits 20,22 at the minimum pressure level established by the system control relief valve 48 while still maintaining the same fluid pressure supply to the system control 50. If the flow from the control pump 40 cannot replace the flow from the pump 12 being passed through the ruptured line 20 or associated leak point, the system control pressure will drop below the minimum pressure level required by the system control 50 thus neutralizing the transmission. The operator then moves his control lever for travel in the opposite direction at which time the system control pressure will be reestablished which will reset the transmission to allow full operation to continue in the opposite direction.

Since the system control 50 is receiving pressurized control fluid, the hydrostatic transmission can still be activated. This allows the vehicle to be operated in the opposite direction by providing a signal to the pump control mechanism 54 to change the pump's directional position which communicates pressurized fluid to high pressure conduit 22 thus causing the motor 14 to turn in the opposite direction. The fluid returning from the motor 14 would still be available to the inlet of the pump 12 even though the high pressure conduit 20 has ruptured since the spaces 28,30 are filled with fluid at the minimum pressure level established by the system control relief valve 48. If the pressure level in the return high pressure conduit 20 increases due to an overrunning condition of the motor 14, the relief valve 34 would control the maximum pressure level in the spaces 28,30 by conducting bypass fluid to the common tank 39 to ensure that the first and second low pressure conduits 24,26 would not rupture.

In view of the foregoing, it is readily apparent that the structure of the present invention provides an improved hydrostatic transmission that allows the vehicle to be movable in an opposite direction upon the failure of the high pressure conduit providing fluid to the motor in the one direction. This arrangement maintains a pressurized control fluid to the system control that is required to operate the hydrostatic transmission while not requiring the addition of an outer conduit that has to withstand the high pressure contained within the inner conduit upon rupture of the inner conduit. Due to the physical size required of the outer conduit and the high pressure contained within the inner conduit, construction of such a conduit would be prohibitive. Thus unexpected rupture of a high pressure line will not totally disable the vehicle but would allow the vehicle to be moved in the opposite direction. This allows the vehicle to be moved from the location the rupture occurred to a location that would enable easier service to replace the ruptured conduit or otherwise repair the leakage failure.

Other aspects, objects and advantages of this invention can be obtained from a study of the drawings, the disclosure and the appended claims.

What is claimed is:

1. In a hydrostatic transmission (10) including a variable displacement pump (12) having a pump control mechanism (54), a fluid motor (14), first and second high pressure conduits (20,22) operatively connecting the pump (12) and motor (14) in a continuous circuit, a system control (50) for controlling the operation of the hydrostatic transmission (10), a source of fluid pressure (40) receiving fluid from a tank (39) and in selective fluid communication with the first and second high pressure conduits (20,22) and the system control (50) for providing make-up fluid to the first and second high pressure conduits (20,22) and for supplying fluid to said system control (50) at a predetermined pressure level, and a system control relief valve (48) for maintaining the predetermined pressure level of the fluid from the fluid source (40), the improvement comprising:

first and second low pressure conduits (24,26) respectively disposed about said first and second high pressure conduits (20,22), a first space (28) defined between an outside diameter of the first high pressure conduit (20) and an inside diameter of the first low pressure conduit (24), a second space (30) defined between an outside diameter of the second high pressure conduit (22) and an inside diameter of the second low pressure conduit (26); and means (32) for controlling the pressure level in the first and second spaces (28,30) to a predetermined maximum pressure level upon the failure of one of the first and second high pressure conduits (20,22).

2. The hydrostatic transmission (10), as set forth in claim 1, wherein said controlling means (32) includes a pressure relief valve (34) in fluid communication with said first and second spaces (28,30), and said tank (39).

3. The hydrostatic transmission (10), as set forth in claim 1, including a reset valve (58) in fluid communication with the first and second high pressure conduits (20,22) and movable between a first position at which said first and second high pressure conduits (20,22) are in open fluid communication, and a second position at which said fluid communication is blocked, said reset valve (58) being movable to said second, blocking position in response to a predetermined pressure signal from said system control (50), and to said first, open position in response to the pressure in said first and second high pressure conduits (20,22) and an absence of said predetermined pressure signal from said system control (50).

4. The hydrostatic transmission (10), as set forth in claim 3, wherein said pump control mechanism (54) is connected to said system control (50) and varies pump displacement in response to an input signal (56) from the system control (50).

5. The hydrostatic transmission (10), as set forth in claim 4, wherein said predetermined pressure level is less than said predetermined maximum pressure level.

6. The hydrostatic transmission (10), as set forth in claim 2, wherein said controlling means (32) includes a conduit (41) to communicate all fluid flow conducted through the relief valve (34) to an inlet of the control pump (40) through a common tank (39).

* * * * *